May 3, 1955
A. BOYLE
2,707,453
ULLAGE INDICATOR
Filed Sept. 2, 1953
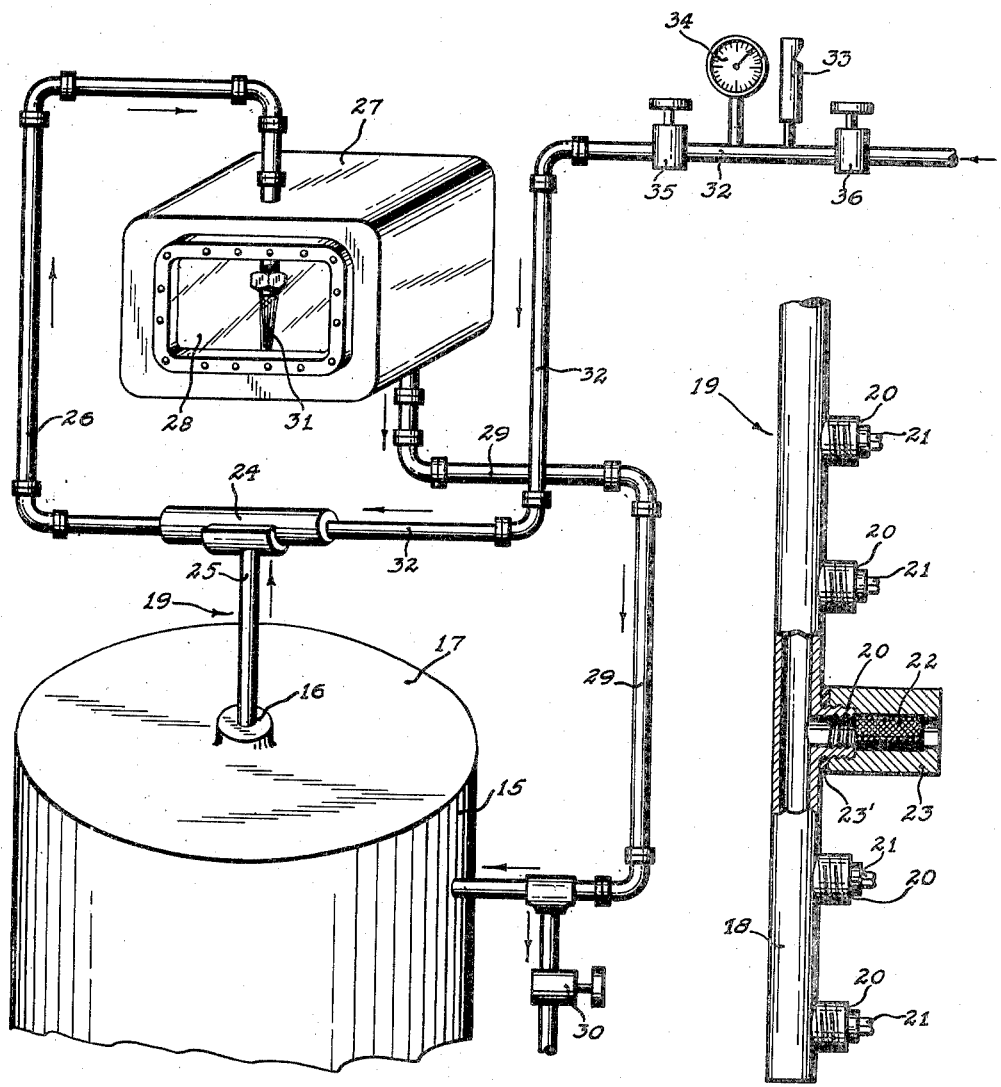
INVENTOR.
ALFRED BOYLE
BY
ATTORNEY

United States Patent Office 2,707,453
Patented May 3, 1955

2,707,453

ULLAGE INDICATOR

Alfred Boyle, New York, N. Y.

Application September 2, 1953, Serial No. 378,047

3 Claims. (Cl. 116—118)

This invention relates to new and useful improvements in ullage indicators.

More particularly, the present invention proposes the construction of an improved ullage indicator for a tank such as one of the oil fuel tanks of an oil burning ship or any fuel tank or fluid container on ship or shore which will accurately indicate when the tank is adequately filled or when it needs refilling.

Another object of the present invention proposes forming an ullage indicator which can easily be adjusted to show any level in a tank such as a marine oil tank and obviate the common method of shining a light into the tank and counting the exposed rungs of a ladder built in the tank.

Still further, the present invention proposes constructing an ullage indicator which will withdraw a steady flow of liquid from a tank until the liquid in the tank reaches a predetermined depth and having a transparent window for convenient visual observance of the rate of flow and which also may be used for and which will act as a smoke indicator for the purpose of determining a fire in compartments or room enclosures.

As a further object, the present invention proposes arranging the casing containing the transparent window so that it has a return conduit to the tank and providing a valve in the conduit to remove samples of the liquid for testing purposes.

The present invention further proposes providing a strainer in the inlet opening of a suction line which will extend into the tank so that the liquid removed from the tank will be sufficiently free of solid matter to flow freely.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a diagrammatic view of an oil tank equipped with the ullage indicator of the present invention, the lower portion of the oil tank being broken away.

Fig. 2 is a fragmentary enlarged view of the suction pipe shown extending into the tank in Fig. 1, portions of the suction pipe being broken away and in section.

The ullage indicator of the present invention, while adapted to show the quantity that any vessel containing any liquid lacks of being full, is shown in a particularly useful application in the example illustrated in the drawings. A marine oil fuel tank 15 is provided with an opening 16 through its top 17 through which extends one end 18 (see Fig. 2) of a suction line 19. This end of the suction line 19 is adapted to extend vertically into the tank.

The end 18 of suction line 19 has a plurality of spaced inlet openings 20 in the form of threaded nipples. Each inlet opening 20 is spaced on the suction line 19 so that it will extend a different predetermined distance into the tank 15.

Plugs 21 are removably secured in all but one of the inlet openings 20, this open inlet opening being chosen according to what liquid level in the tank it is desired to indicate. A strainer 22 is secured over the open inlet opening 20 in the suction line 19 by a threaded sleeve 23, a gasket 23' being also provided. The strainer preferably is of fine mesh but may be any other type of strainer or filter suitable for the liquid in the tank.

A syphon valve 24 is connected with the other end 25 of the suction line 19. A conduit 26 connects the syphon valve 24 with a hollow casing 27, the conduit entering the top of the casing 27 above a transparent side window 28 in the casing.

The casing 27 also has a return conduit 29 connected to it extending from the bottom of the casing 27 to the tank 15. A valve 30 is provided in the return conduit 29 to remove samples of the oil withdrawn from the tank 15 for testing purposes, such as to test viscosity and the like. The return conduit 29 provides means to return oil withdrawn from tank 15 to the tank and the transparent side window 28 in casing 27 provides means to view the flow of oil drawn from and returned to the tank.

Conduit 26 from the syphon valve 24 to the hollow casing 27 terminates in the casing at or near the top of the window 28 so that the flow of oil 31 from the conduit 26 can easily and conveniently be observed through the window outside the casing 27. A bank of such casings 27 and windows 28, as the one shown, one for each fuel tank in a vessel, may be provided on a wall.

Syphon valve 24 may be operated by air, water, steam, or gas under pressure and from pressure sources not shown. A line 32 leading from such source is connected with the suction valve 24. When steam or air is used, a whistle 33 is provided in the line 32 and a pressure gauge 34 is provided in any event. Shutoff valves 35 and 36 are disposed in the line on each side of the gauge and whistle.

While the valves are all shown as hand operated, they may also be electrically operated valves and may be operated by an electric clock (not shown) set for a predetermined time to open the valves and give an ullage reading.

It will be apparent that as long as the syphon valve is operating, and while the liquid level in the tank is above the open inlet opening 20 in the suction line 19, a steady flow of oil will be withdrawn from the tank 15 and will be carried up to the casing 27 where the flow can be observed through window 28 before the oil is returned to the tank 15 by return conduit 29. When the liquid level in the tank falls below the open inlet opening 20 in the suction line 19, however, the flow will cease and such reduction and stoppage in the rate of flow can be readily observed through the window 28.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent, is:

1. An ullage indicator for a tank comprising a suction line having one end adapted to extend vertically into the tank, said suction line having a plurality of spaced inlet openings spaced thereon for each to extend a different predetermined distance into the tank, plugs removably secured in all but one of said inlet openings, a syphon valve connected with the other end of the suction line, a hollow casing with a transparent side window, a conduit connecting the syphon valve with the casing above the window, a discharge nozzle extending substantially within said casing, and means to operate the suction valve to draw liquid from the tank through the open inlet opening in the suction line to the casing so that the flow can be observed through the window, and a return conduit connecting the casing with the tank to return the liquid so withdrawn, and a strainer over the open inlet opening in the suction line.

2. An ullage indicator for a tank comprising a suction line extending into said tank, a plurality of vertically spaced inlet openings in said suction line, means closing all but one of said openings, a syphon valve secured to the free end of said suction line, a hollow casing having a viewing window therein, a conduit connecting said syphon and said casing, said conduit extending within said casing, a return conduit connecting said casing and the tank for return flow of oil, a valve in said return conduit for removing samples of oil, and a compressed air tube secured to said syphon to operate the syphon valve, said air tube including a pressure gauge and a steam whistle.

3. The combination of claim 2, wherein said open inlet opening has a sleeve secured thereto, a strainer in said sleeve, and a gasket between said opening and sleeve.

References Cited in the file of this patent

UNITED STATES PATENTS

| | | |
|---|---|---|
| 1,745,656 | Baker | Feb. 4, 1930 |
| 2,027,417 | Clurman | Jan. 14, 1936 |
| 2,141,325 | Werder | Dec. 27, 1938 |
| 2,500,781 | Werder | Mar. 14, 1950 |

FOREIGN PATENTS

| | | |
|---|---|---|
| 611,890 | Great Britain | Nov. 4, 1948 |